United States Patent [19]

Ullrich et al.

[11] 4,318,677
[45] Mar. 9, 1982

[54] SMALL VOLUME OUTLET APPARATUS WITH A SIEVE CHANGING DEVICE FOR MULTIPLE SHAFT SCREW MACHINES

[75] Inventors: Martin Ullrich, Leverkusen; Heinz Gemperlein, Dormagen, both of Fed. Rep. of Germany

[73] Assignee: Bayer Aktiengesellschaft, Leverkusen, Fed. Rep. of Germany

[21] Appl. No.: 68,354

[22] Filed: Aug. 21, 1979
(Under 37 CFR 1.47)

[30] Foreign Application Priority Data

Aug. 23, 1978 [DE] Fed. Rep. of Germany ....... 2836847

[51] Int. Cl.³ ............................................... B29B 5/00
[52] U.S. Cl. .................................... 425/183; 210/236; 366/83; 366/87; 425/185; 425/197; 425/379 R
[58] Field of Search ............... 425/198, 197, 183, 185, 425/379; 210/236, 77, 387; 366/83–85, 87

[56] References Cited

U.S. PATENT DOCUMENTS

| | | | |
|---|---|---|---|
| 2,661,497 | 12/1953 | Birmingham | 425/183 |
| 2,786,504 | 3/1957 | Samller | 425/198 |
| 3,007,199 | 11/1961 | Curtis | 425/185 |
| 3,112,525 | 12/1963 | Moziek | 425/185 |
| 3,653,419 | 4/1972 | Schutter | 425/183 |
| 3,684,419 | 8/1972 | Voight | 425/192 |
| 3,947,202 | 3/1976 | Göller et al. | 425/185 |
| 4,025,434 | 5/1977 | Mladota | 236/447 |

FOREIGN PATENT DOCUMENTS

| | | |
|---|---|---|
| 1729189 | 6/1971 | Fed. Rep. of Germany . |
| 7128674 | 7/1971 | Fed. Rep. of Germany . |
| 2104987 | 8/1972 | Fed. Rep. of Germany . |

OTHER PUBLICATIONS

"Schnecken Maschinen in der Verfahrenstechnik", H. Herrmann, Springer-Verlag Berlin Heidelberg, N.Y., N.Y., 1972, pp. 120–135.

*Primary Examiner*—Jeffery R. Thurlow
*Attorney, Agent, or Firm*—Gene Harsh; Joseph C. Gil; Lyndanne M. Whalen

[57] ABSTRACT

The invention relates to a small volume outlet apparatus for multiple shaft screw machines for highly viscous materials at the discharge end of a multiple shaft screw having a sieve changing device arranged in it.

6 Claims, 8 Drawing Figures

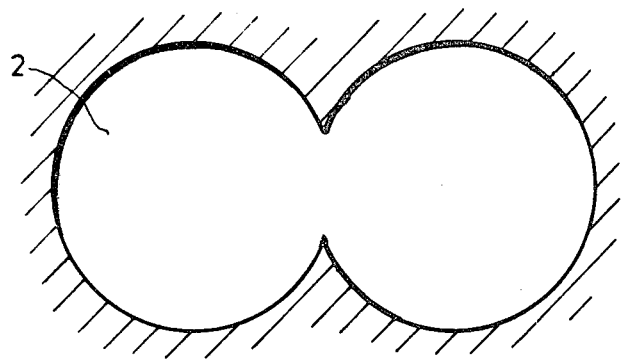
FIG. 2 (I-I)
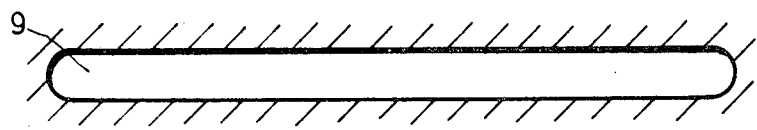
FIG. 3 (II-II)
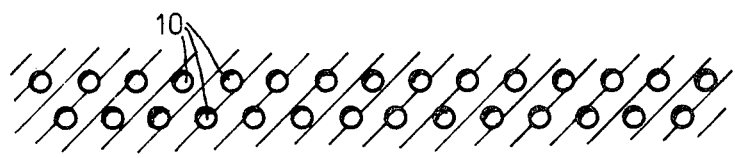
FIG. 4 (III-III)
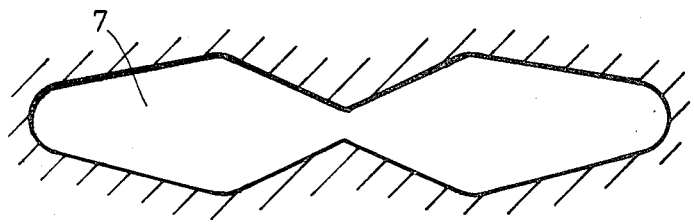
FIG. 5 (IV-IV)

SMALL VOLUME OUTLET APPARATUS WITH A SIEVE CHANGING DEVICE FOR MULTIPLE SHAFT SCREW MACHINES

BACKGROUND OF THE INVENTION

A stream of high viscosity material can be discharged uniformly and in a shaped manner using screw machines. Plastic and viscoelastic compositions can be contaminated by foreign bodies such as, for example, particles of dirt or rust. Undesirable solids are filtered out in a filtering process with the aid of fine sieves which allow the plastic or viscoelastic composition to flow through but which retain the particles of solids. Sieve changing devices with round sieve plates are known. They are mounted on the extruder flange with suitable adaptors and inserts. The main body is provided with a hydraulically activated sliding plate and a sealing system. In order to change the sieves, a cassette with two sieves arranged in it is pushed by means of a cassette guide under a high pressure load by a hydraulic device transversely through the stream of melt, the first, already soiled sieve coated with particles of foreign matter being removed from the stream of melt and the second new sieve being placed in the stream of melt. The sieve changing process takes place under the high static axial pressure of the sliding faces so as to prevent melt from issuing laterally, as much as possible. A sieve changing device in a two-shaft kneading disc screw press is also known. However, the cross-section of the sieve is also round in this case. A "figure of eight-to-round member" which is fitted between the tips of the screws and the perforated plate has been developed for it. The cross-section of flow must be altered to the cross-section of the respective die shape, for example a perforated ridge, after the round plane of the sieve. It has been found that, in screw processes, thermally sensitive polymers are so highly stressed at the end of a screw process that the volume of the "figure-of-eight member" of the sieve devices and of the die must be considered as a dead space. Although continuous, kinematically compelling self-cleaning and forced feed prevails in the region of the screw shafts, in particular in the case of closely intermeshing multiple shaft screws which rotate in the same direction (see, for example, H. Herrmann, Schneckenmaschinen in der Verfahrenstechnik, Springer, Berlin, Heidelberg, New York, 1972, page 120 et seq), the material is conveyed in a laminar flow but without mechanical force and self-cleaning in the space between the end of the screw shaft and the die openings, merely by means of the pressure produced by the screw. This transitional space from the screw contour to the die openings is unavoidable. It results in a broader residence time spectrum and gives rise to the risk of damage to the material.

BRIEF DESCRIPTION OF THE DRAWINGS

FIG. 2 shows the figure-of-eight shaped cross-section of the double screw.

FIG. 3 shows the slit-like cross-section of the perforated bead.

FIG. 4 shows the cross-section of a perforated bead in two rows.

FIG. 5 shows the open cross-sectional area of flow in the position of the sieve changing apparatus.

FIG. 8 shows the shifting apparatus for the sieve cassettes.

DESCRIPTION OF THE INVENTION

The invention relates to a small volume outlet apparatus with a sieve changing device for multiple shaft screw machines, and in particular, a small volume outlet apparatus with a sieve changing device for two-shaft screw machines. The apparatus of the invention is comprised substantially of three sections—first, second and third. The first section comprises a housing having a first passage therein adapted to receive one or more multiple screw shafts and where said first passage has an outlet end and an inlet end, the cross-sectional area of said outlet end being less than the cross-sectional area of said inlet end. The second section is movable in the axial direction of and is connected to the first section by way of a clamping pressure means. This second section has a second passage which has an outlet end and an inlet end, the cross-sectional area of the outlet end being less than the cross-sectional area of the inlet end. The outlet end is in the shape of a slot and the inlet end has a shape and dimension to coincide with the outlet end of the first passage in the first section. The third section comprises a housing having a third passage which has an outlet end and an inlet end wherein this third section is rigidly fixed to the second section. The inlet end of said third passage coincides with the outlet end of said second section and the outlet end of the third section is a perforated ridge in one or two rows. A sieve changing device comprising a cassette and sieve assembly is located between the mating faces of the first section and the second section. This cassette and sieve assembly has substantially the same cross-sectional area and configuration as the outlet end of the first section and the inlet end of the second section. The cassette and sieve assembly is held in position by the same clamping means that holds the first and second sections together. In addition, a moving means is utilized to move a new clean cassette and sieve assembly into position in the stream of the melt and simultaneously to remove a contaminated cassette and sieve assembly, a pin being provided to ensure exact alignment every time. All three sections can be provided with internal cavities to allow for their being heated by means of passing either a hot liquid or hot gases through said internal cavities. The cassette body and sieve assembly and cassette track can also be heated. The apparatus could also be heated using electrical resistance heating. A preferred small volume outlet apparatus with a sieve changing device is characterized in that the cross-sectional shape of the inlet of the first section passes via a round cross-sectional configuration directly to the slot configuration of the outlet of the second section. In addition, the clamping means and the cassette moving means are preferably hydraulically activated and the entire apparatus is heated using a fluid or gas flow through the internal cavities provided.

Figure 1:
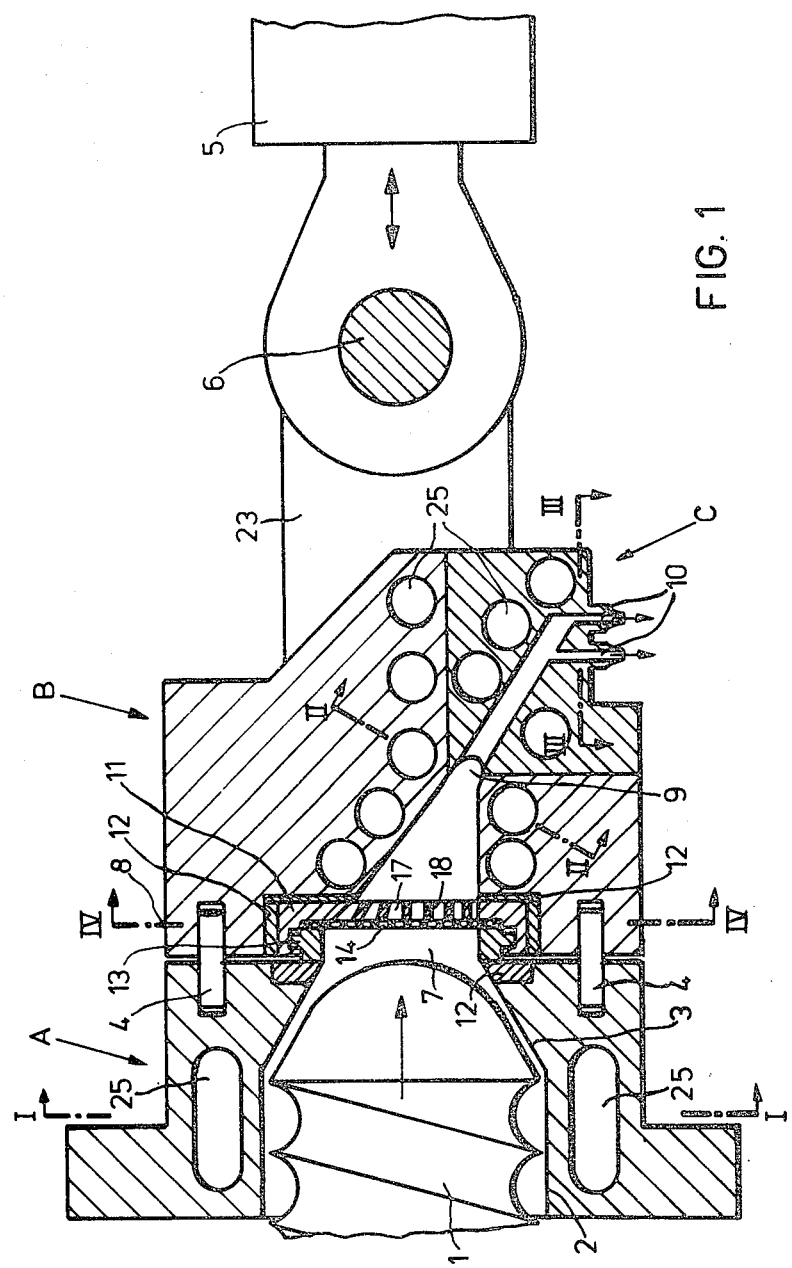
FIG. 1 shows a longitudinal section through a small volume outlet apparatus with a sieve changing device for two shaft screw machines.

The longitudinal section in FIG. 1 shows the three sections first, second and third (A, B and C, respectively) of the outlet apparatus for the screw machine. The two adjacent intermeshing screw shafts 1 project with their figure-of-eight shaped cross-section into the first section of the small volume die head. The transition of cross-section 3 from the figure-of-eight to the slot shape begins immediately at the end of the screw shaft. The tip of the screw projects into the first section. The second section is adjusted in its position relative to the first section by means of guide pins 4 which allow axial shifting. The axially acting hydraulic release and pressure means 5 engages centrally and at a point in the middle of the bolt 6 of the second section. It is obvious that the pressure forces transmitted by the hydraulic pressure means 5 via the second section onto the first section are taken up in a yoke (not shown here), which is outside the hydraulic means 5 and extends beyond the first section, and are taken up as tensile stresses therein.

Figure 7:
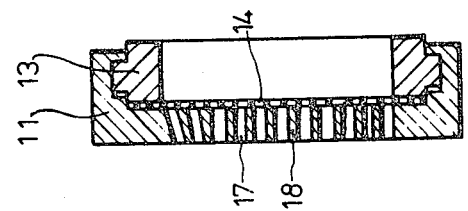
FIG. 7 shows a section through the sieve cassette.
Figure 6:
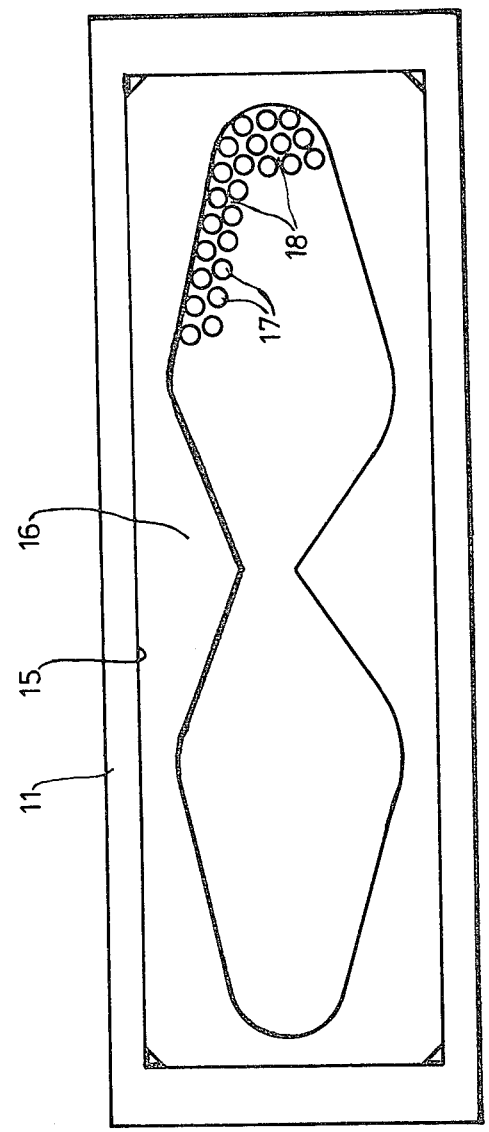
FIG. 6 shows the sieve cassette.

The space filled with melt in the first section changes from a figure-of-eight shaped screw cross-section 2 (see also Section I—I in FIG. 2) to the cross-sectional area 7 (see also FIG. 5: Section IV—IV) of the slot-like cross-section 9 in the second section (see FIG. 3: Section II—II). This cross-section 9 is multiplied in the third section into die openings 10. The zig-zag arrangement of the die openings 10 in two rows is illustrated again in Section III—III of FIG. 4. The sieve cassette 11 is located in a cassette guide 12 between the first and second sections. The cassette 11 is illustrated again separately in a plan view and in a section in FIGS. 6 and 7. The cassette consists of two parts, the actual cassette 11 and the pressure frame 13, between which is clamped the sieve 14 consisting of the actual sieve and a coarse support sieve lying downstream thereof. The sieve to be inserted need not have the complicated circumferential contour of the cross-sectional 7 area of the first or second sections. It is of such a size that it can be inserted into the recess 15 in the cassette 11. When pressed together, a partial area 16 of this simple rectangular sieve is covered, while the melt passes continuously through all the mentioned cross-sectional shapes from the figure-of-eight shaped double screw 1 to the die openings 10 in a manner which is beneficial to the flow. A coarse supporting sieve plate 18, provided with numerous 17, is arranged in the cassette body 11, downstream of the clamped sieve 14, thus connected to the above-mentioned coarse supporting sieve. This supporting plate 18 is worked into the metal of the cassette 11, has the contour of the circumferential area 7 of the outlet of the first sections and inlet of the second section and the function of taking up the pressure forces of the melt on the fine sieve and the supporting sieve and introducing them via the cassette into the second section.

FIG. 8 shows the hydraulic shifting means 19 which acts transversely to the screw axis 1 and which slides in a new cassette and sieve assembly 11a with a clean sieve 14 to the right in the stream of melt fractions of a second after the release of the axial hydraulic pressing means 5 and, in so doing, shifts the cassette and sieve assembly 11b already covered with particles of foreign matter out from the stream of melt toward the right into the removal position 11c. A stop ensures that the new cassette and sieve assembly passes exactly into the correct position 11b in the stream of melt, after which the axial hydraulic pressure means 5 immediately presses the two sections, first and second, together again with the interposed cassette and sieve assembly 11. The automated sieve changing process lasts a total of about 1.5 seconds. It is beneficial always to deliver the cassette and sieve assembly 11 on the same side and to remove them on the other. The axial hydraulic release means 5 reduces only the pressure force. It involves a virtually pathless release of the pressure and, therefore, only a very small amount of melt flows laterally outwards at the cassette guide during the momentary sieve changing process. The hydraulic shifting means 19 above the die head with transmission of force via the connecting rod 20, the connection 21 and the forcing rod 22 as well as the taking up of the transverse force by means of the rollers 23 in the roller track 24 is a possible embodiment. it has the advantage of being a structure which requires only a small amount of space in the lateral direction.

In order to control the temperature of the outlet apparatus, passages 25 which are beneficially distributed in the first, second and third sections are provided to allow the components to be traversed with a liquid or vaporous heat carrier. The temperature of the apparatus can, however, also be controlled by means of electrical resistance heating. The new cassette and sieve assembly 11a must be preheated to the temperature of the melt prior to insertion in the cassette track 26. The cassette track 26 can also be heated in order to keep the new cassette and sieve assembly 11a hot until the sieve is changed just after insertion.

The apparatus according to the invention has the following advantages over the prior art:

(1) The outlet apparatus for screw machines is of small volume. In a double screw with a screw diameter of 120 mm, adaptor members, round sieve plane and downward extrusion, the volume of product amounts to about 5.2:1; in the outlet apparatus for a two-shaft screw machine according to the invention, the adaptor members are dispensed with and the volume of product diminishes to about 1.3:1. The "dead space" has thus been reduced to about a quarter, the residence time in this die body which is not forcibly cleaned but only traversed by a laminar flow has also diminished to about a quarter.

(2) Since the sieve lies in a region where the cross-section is still relatively large, the service lives of the sieves between two sieve changing processes are increased. The effective cross-sectional area of the sieve (it is substantially in the shape of a "dog's bone" in FIG. 6) is larger than in the case where the cross-section of the cavity has to be changed to a circle.

(3) The insertion of a sieve in its own cassette and the lateral shifting of these cassettes always in the same direction brings clean cassette faces through the stream of melt during each sieve changing process. Soiled sieves and cassettes always leave the stream of product on the same side and clean cassettes and sieves invariably come from the other side. Contamination of the melt is thus prevented as it would not otherwise be possible to clean the cassette of the products of cracking which unavoidably occur, for example during the to and fro movement of one and the same double cassette, with a comparable outlay.

(4) The axially acting hydraulic pressure and release means allows smooth lateral shifting of the cassette and sieve assembly without very large shifting forces owing to the virtually pathless release of the pressure. A sieve cassette does not, therefore, need to be as sturdy and thick as one which has to be pushed by considerably greater forces with complete pressure. This, in turn, means a reduction in the volume of "dead space" and the cassette guide is damaged to a lesser extent by particles of foreign bodies (striation) owing to the smooth lateral shifting without high axial pressures.

What is claimed is:

1. A small volume outlet apparatus with a sieve changing device for multiple screw shaft machines comprising three sections whose mating surfaces have coinciding passage openings therein, and wherein the continuous passageway thus formed is continuously more restrictive, said apparatus comprising (A) a first section comprising a housing, having a first passage therein, wherein said first passage is adapted to receive one or more multiple screw shafts and wherein said first passage has an inlet end and an outlet end, the cross-sectional area of said outlet end being less than the cross-sectional area of said inlet end;

(B) a second section movable in the axial direction of and connected to said first section by way of a pressure clamping means, said second section comprising a housing having a second passage therein, where said second passage has an inlet end and an outlet end, the inlet end of said second passage being arranged so that it coincides to the outlet of said first passage, wherein the cross-sectional area of the outlet end of said second passage is less than the cross-sectional area of the inlet end of said second passage and wherein the cross-sectional area of the outlet of said second passage is in the shape of a slot;

(C) a third section, rigidly fixed to the said second section, comprising a housing having a third passage therein, wherein said third passage has an inlet end and an outlet end, the inlet of said third passage being arranged so that it coincides with the outlet of said second passage and having an outlet end in the form of a perforated ridge of one or two rows;

(D) a sieve changing device comprising a cassette and a sieve assembly therein, wherein said cassette and sieve assembly is located in the channel between the mating faces of the first and second sections, wherein said cassette and sieve assembly have substantially the same cross-sectional area and configuration as the outlet of said first section and the inlet of said second section, wherein the cassette and sieve assembly are held in place by the clamping means used to attach the first and second sections together and wherein a moving means is provided to move a clean cassette and sieve assembly into position and remove a contaminated cassette and sieve assembly.

2. The apparatus of claim 1 whereby the clamping means and the moving means are hydraulically activated.

3. The apparatus of claim 1 wherein the said three sections have internal cavities to allow heating by means of hot gas flow or hot fluid flow through said internal cavities.

4. The apparatus of claim 1 whereby the said three sections are heated by means of electrical resistance heating.

5. The apparatus of claim 3 whereby the cassette and sieve assembly and channel are heated.

6. The apparatus of claim 1 wherein the apparatus is for a two-shaft screw machine.

* * * * *